US008644862B2

(12) United States Patent
Athalye et al.

(10) Patent No.: US 8,644,862 B2
(45) Date of Patent: *Feb. 4, 2014

(54) METHOD AND SYSTEM FOR SIGNALING IN BROADCAST COMMUNICATION SYSTEM

(75) Inventors: Sanjeev Arvind Athalye, San Diego, CA (US); Ragulan Sinnarajah, Markham (CA); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/052,977

(22) Filed: Mar. 21, 2011

(65) Prior Publication Data

US 2011/0170470 A1 Jul. 14, 2011

Related U.S. Application Data

(63) Continuation of application No. 10/938,712, filed on Sep. 10, 2004, now Pat. No. 7,912,485.

(60) Provisional application No. 60/502,504, filed on Sep. 11, 2003.

(51) Int. Cl.
*H04W 68/00* (2009.01)

(52) U.S. Cl.
USPC ........... 455/458; 455/515; 370/312; 370/343; 370/329

(58) Field of Classification Search
USPC .................... 455/458, 515; 370/312, 343, 329
See application file for complete search history.

(56) References Cited

U.S. PATENT DOCUMENTS

| 4,424,565 | A | 1/1984 | Larson |
| 4,521,806 | A | 6/1985 | Abraham |
| 4,901,307 | A | 2/1990 | Gilhousen et al. |
| 5,091,905 | A | 2/1992 | Amada |
| 5,103,459 | A | 4/1992 | Gilhousen et al. |
| 5,267,261 | A | 11/1993 | Blakeney, II et al. |
| 5,504,773 | A | 4/1996 | Padovani et al. |
| 5,548,814 | A | 8/1996 | Lorang et al. |

(Continued)

FOREIGN PATENT DOCUMENTS

| EP | 1006746 A2 | 6/2000 |
| EP | 1085660 | 3/2001 |

(Continued)

OTHER PUBLICATIONS

3GPP TS 25.211 V6.1.0 (Jun. 2004): 3rd Generation Partnership Project; Technical Specification Group Radio Access Network; Physical channels and mapping of transport channels onto physical channels (FDD)(Release 6).

(Continued)

*Primary Examiner* — Ajit Patel
(74) *Attorney, Agent, or Firm* — Howard Seo

(57) ABSTRACT

A method and a system for providing signaling in cellular telephone system providing broadcast services to fully integrate broadcast services with the services provided by the cellular telephone systems. The signaling method coordinate interaction between an access network and the subscriber station to allowing the subscriber station to decode the broadcast service, to receive paging messages while receiving the broadcast service, to properly transition between operation states, and other functions known to one of ordinary skill in the art.

48 Claims, 3 Drawing Sheets

(56) References Cited

U.S. PATENT DOCUMENTS

| | | | |
|---|---|---|---|
| 5,577,022 A | 11/1996 | Padovani et al. |
| 5,594,718 A | 1/1997 | Weaver, Jr. et al. |
| 5,642,398 A | 6/1997 | Tiedemann, Jr. et al. |
| 5,678,184 A | 10/1997 | Cutler, Jr. et al. |
| 5,722,044 A | 2/1998 | Padovani et al. |
| 5,812,540 A | 9/1998 | Bruckert et al. |
| 5,844,620 A | 12/1998 | Coleman et al. |
| 5,873,043 A | 2/1999 | Comer |
| 5,909,651 A | 6/1999 | Chander et al. |
| 5,933,787 A | 8/1999 | Gilhousen et al. |
| 5,974,320 A | 10/1999 | Ward et al. |
| 6,032,205 A | 2/2000 | Ogimoto et al. |
| 6,049,323 A | 4/2000 | Rockwell et al. |
| 6,055,428 A | 4/2000 | Soliman |
| 6,108,706 A | 8/2000 | Birdwell et al. |
| 6,122,514 A | 9/2000 | Spaur et al. |
| 6,178,446 B1 | 1/2001 | Gerszberg et al. |
| 6,233,455 B1 | 5/2001 | Ramakrishna et al. |
| 6,272,117 B1 | 8/2001 | Choi et al. |
| 6,337,983 B1 | 1/2002 | Bonta et al. |
| 6,344,882 B1 | 2/2002 | Shim et al. |
| 6,351,656 B1 | 2/2002 | Burgan et al. |
| 6,393,282 B1 | 5/2002 | Ilmori |
| 6,393,295 B1 | 5/2002 | Butler et al. |
| 6,400,946 B1 | 6/2002 | Vazvan et al. |
| 6,434,389 B1 | 8/2002 | Meskanen et al. |
| 6,434,390 B2 | 8/2002 | Rahman |
| 6,452,644 B1 | 9/2002 | Shimakawa et al. |
| 6,462,671 B2 | 10/2002 | Bushner et al. |
| 6,477,157 B1 | 11/2002 | Kim et al. |
| 6,505,160 B1 | 1/2003 | Levy et al. |
| 6,526,027 B1 | 2/2003 | Yeom |
| 6,539,030 B1 | 3/2003 | Bender et al. |
| 6,542,742 B2 | 4/2003 | Schramm et al. |
| 6,556,131 B1 | 4/2003 | Besharat et al. |
| 6,574,211 B2 | 6/2003 | Padovani et al. |
| 6,584,087 B1 | 6/2003 | Czaja et al. |
| 6,594,498 B1 | 7/2003 | McKenna et al. |
| 6,651,141 B2 | 11/2003 | Adrangi |
| 6,681,114 B2 | 1/2004 | Chang et al. |
| 6,697,651 B2 | 2/2004 | Li |
| 6,704,328 B1 | 3/2004 | Khaleghi et al. |
| 6,731,936 B2 | 5/2004 | Chen et al. |
| 6,747,962 B2 | 6/2004 | Lintulampi et al. |
| 6,785,551 B1 | 8/2004 | Richard |
| 6,829,486 B2 | 12/2004 | McKenna et al. |
| 6,845,104 B2 | 1/2005 | Johnson et al. |
| 6,892,073 B2 | 5/2005 | Fattouch |
| 6,904,611 B1 | 6/2005 | Poli et al. |
| 6,940,421 B2 | 9/2005 | Chamberlain et al. |
| 6,961,316 B2 | 11/2005 | Yamaguchi et al. |
| 6,980,820 B2 | 12/2005 | Sinnarajah et al. |
| 6,985,779 B2 | 1/2006 | Hsiung et al. |
| 6,993,000 B2 | 1/2006 | Famolari |
| 7,035,383 B2 | 4/2006 | O'neal |
| 7,054,660 B2 | 5/2006 | Lord |
| 7,061,880 B2 | 6/2006 | Basilier |
| 7,142,860 B2 | 11/2006 | Mildh et al. |
| 7,231,399 B1 | 6/2007 | Bem et al. |
| 7,236,788 B2 | 6/2007 | Mohebbi |
| 7,246,365 B2 | 7/2007 | Lee |
| 7,254,394 B2 | 8/2007 | Chen et al. |
| 7,277,407 B2 | 10/2007 | Kim et al. |
| 7,293,094 B2 | 11/2007 | Vaman et al. |
| 7,327,676 B2 | 2/2008 | Teruhi et al. |
| 7,336,952 B2 | 2/2008 | Leung |
| 7,346,374 B2 | 3/2008 | Witkowski et al. |
| 7,359,715 B2 | 4/2008 | Choksi |
| 7,411,901 B1 | 8/2008 | Alexander et al. |
| 7,415,283 B2 | 8/2008 | Sinnarajah et al. |
| 7,689,226 B2 | 3/2010 | Sinnarajah et al. |
| 7,912,485 B2 | 3/2011 | Sinnarajah et al. |
| 7,937,086 B2 | 5/2011 | Chen et al. |
| 2001/0017851 A1 | 8/2001 | Yamaguchi et al. |
| 2001/0040511 A1 | 11/2001 | Bushner et al. |
| 2001/0048735 A1 | 12/2001 | O'neal |
| 2002/0010789 A1 | 1/2002 | Lord |
| 2002/0032024 A1 | 3/2002 | Namba et al. |
| 2002/0039907 A1 | 4/2002 | McKenna et al. |
| 2002/0046407 A1 | 4/2002 | Franco |
| 2002/0067284 A1 | 6/2002 | Chamberlain et al. |
| 2002/0087797 A1 | 7/2002 | Adrangi |
| 2002/0169885 A1 | 11/2002 | Alao et al. |
| 2002/0174439 A1 | 11/2002 | Akiyama et al. |
| 2002/0193139 A1 | 12/2002 | Mildh et al. |
| 2002/0194607 A1 | 12/2002 | Connelly |
| 2003/0036384 A1 | 2/2003 | Chen et al. |
| 2003/0054807 A1 | 3/2003 | Hsu et al. |
| 2003/0072269 A1 | 4/2003 | Teruhi et al. |
| 2003/0073441 A1 | 4/2003 | Fattouch |
| 2003/0078044 A1 | 4/2003 | Leung |
| 2003/0109951 A1 | 6/2003 | Hsiung et al. |
| 2003/0114177 A1 | 6/2003 | Sinnarajah et al. |
| 2003/0134622 A1 | 7/2003 | Hsu et al. |
| 2003/0157949 A1 | 8/2003 | Sarkkinen et al. |
| 2003/0165155 A1 | 9/2003 | Johnson et al. |
| 2004/0048622 A1 | 3/2004 | Witkowski et al. |
| 2004/0085909 A1 | 5/2004 | Soliman |
| 2004/0125740 A1 | 7/2004 | Gardner |
| 2004/0198371 A1 | 10/2004 | Balasubramanian et al. |
| 2004/0203816 A1 | 10/2004 | Bae et al. |
| 2005/0053023 A1 | 3/2005 | Rajkotia et al. |
| 2005/0054331 A1* | 3/2005 | Balachandran et al. ... 455/414.1 |
| 2005/0063340 A1 | 3/2005 | Hoffmann et al. |
| 2005/0075107 A1 | 4/2005 | Wang et al. |
| 2005/0157669 A1* | 7/2005 | Zhu et al. ...................... 370/312 |
| 2005/0243744 A1* | 11/2005 | Tan ................ 370/278 |
| 2006/0028995 A1 | 2/2006 | Canoy et al. |
| 2007/0061845 A1 | 3/2007 | Barnes, Jr. |
| 2007/0099632 A1 | 5/2007 | Choksi |
| 2008/0216106 A1 | 9/2008 | Maxwell et al. |

FOREIGN PATENT DOCUMENTS

| | | |
|---|---|---|
| EP | 1109418 A2 | 6/2001 |
| EP | 1189469 | 3/2002 |
| JP | 10509293 T | 9/1998 |
| JP | 11501783 | 2/1999 |
| JP | 11069437 | 9/1999 |
| JP | 2000224648 | 8/2000 |
| JP | 2000312371 | 11/2000 |
| JP | 2001069549 | 3/2001 |
| JP | 2002095405 A | 4/2002 |
| JP | 20020095045 | 11/2002 |
| KR | 199932845 | 12/1999 |
| KR | 20010053883 | 7/2001 |
| KR | 20030048502 | 6/2003 |
| RU | 2155451 | 8/2000 |
| WO | WO9610895 A1 | 4/1996 |
| WO | WO9628947 | 9/1996 |
| WO | WO9833288 | 7/1998 |
| WO | 9925137 A1 | 5/1999 |
| WO | 9927718 | 6/1999 |
| WO | 9935778 A2 | 7/1999 |
| WO | WO9952304 | 10/1999 |
| WO | WO0027158 | 5/2000 |
| WO | WO0110146 | 2/2001 |
| WO | 0139577 A1 | 6/2001 |
| WO | WO0149061 | 7/2001 |
| WO | 0247417 A1 | 6/2002 |
| WO | 03026181 A1 | 3/2003 |
| WO | WO03037030 | 5/2003 |
| WO | WO03063418 A1 | 7/2003 |
| WO | WO03071725 A2 | 8/2003 |
| WO | WO2004039002 | 5/2004 |

OTHER PUBLICATIONS

3GPP TS 25.212 V6.2.0 (Jun. 2004): 3rd Generation Partnership Project; Technical Specification Group Radio Access Network; Multiplexing and channel coding (FDD)(Release 6).

3GPP TS 25.213 v6.0.0 (Dec. 2003) 3rd Generation Partnership Project; Technical Specification Group Radio Access Network; Spreading and Modulation (FDD) (Release 6).

(56) References Cited

OTHER PUBLICATIONS

3GPP TS 25.214 v6.2.0 (Jun. 2004) 3rd Generation Partnership Project; Technical Specification Group Radio Access Network; Physical Layer Procedures (FDD) (Release 6).

3GPP2-C.S0002-C v3.0, "Physical Layer Standard for cdma2000 Spread Spectrum Systems", (TR 45.5), , Jun. 2001.

Chen, U.S. Appl. No. 60/279,970, "Method and Apparatus for Group Calls Using Dedicated and Common channels in Wireless Networks," Mar. 28, 2001.

"Digital cellular telecommunications system (Phase 2+); (GSM) Universal Mobile Telecommunications System (UMTS): General Packet Radio Service (GRPS) Service description; Stage 2 (3GPP TS 23.060 Ver. 3.8.0 Rel. 1999)," ETSI TS 123 060 Ver. 3.8.0, Jun. 1, 2001, pp. 134-135.

"Digital cellular telecommunications system (Phase 2+); Technical realization of Short Message Service Cell Broadcast (SMSCB) (GSM 03.41 Ver. 5.8.1), "European Telecommunication Standard, 4th Ed. No. ETS 300 902, Jun. 1998, pp. 1-30.

"Digital cellular telecommunications system (Phase 2+); Voice Broadcast Service (VBS); Stage 2 (GSM 03.69 Ver. 7.0.0 Rel. 1998)," ETSI TS 100 934, Ver. 7.0.0, Aug. 1, 1999, pp. 19-20.

ETSI TS 125 211 v4.1.0; "Universal Mobile Telecommunications System (UMTS); Physical channels and mapping of transport channels onto physical channels (FDD)"; 3GPP TS 25.211 version 4.1.0 Release 4 (Jun. 2001).

ETSI TS 125 212 v4.1.0; "Universal Mobile Telecommunications System (UMTS); Multiplexing and channel coding (FDD)", 3G TS 25.212 version 4.1.0 Release 4 (Jun. 2001).

ETSI TD 125 213 v4.1.0; Universal Mobile Telecommunications System (UMTS); Spreading and modulation (FDD), 3G TS 25 213 version 4.1.0 Release 4 (Jun. 2001).

ETSI TS 125 214 v4.1.0; "Universal Mobile Telecommunications System (UMTS); Physical layer procedures (FDD)", 3G TS 25.214 version 4.1.0 Release 4 (Jun. 2001).

European Search Report—EP09171011, Search Authority—Munich Patent Office, Nov. 4, 2009.

European Search Report—EP10009638, Search Authority—Munich Patent Office , Nov. 30, 2010.

European Search Report—EP05011240, European Search Authority Munich, Jun. 30, 2005.

European Search Report—EP05011241, European Search Authority Munich, Nov. 15, 2005.

International Preliminary Report on Patentability—PCT/US04/030102, International Bureau of WIPO-Switzerland, Mar. 13, 2006.

International Search Report—PCT/US05/027640, International Search Authority, European Patent Office—Nov. 25, 2005.

International Search Report and Written Opinion—PCT/US04/030102, International Search Authority—European Patent Office, Nov. 17, 2005.

International Search Report PCT/US02/026036—International Search Authority—European Patent Office—Feb. 7, 2003.

International Search Report—PCT/US02/026448, International Search Authority European Patent Office, Jul. 10, 2003.

SWG2.3 BCMCS ADHOC: "Signaling Support for 1X BCMCS" 3GPP2, Aug. 28, 2003, pp. 1-53, XP002315846.

Telecommunications Industry Association, "Mobile Station-Base Station Compatability Standard for Dual-Mode Wideband Spread Spectrum Cellular System," TIA/EIA-95, Jul. 1993.

TIA/EIA/IS-856, "cdma2000 High Rate Packet Data Air Interface Specifications," 3GPP2C.S0024, Version 2.0 Oct. 27, 2000, pp. 1-441.

TIA/EIA/IS-95 "Mobile Station-Base Station Compatability Standard for Dual-Mode Wideband Spread Spectrum Cellular System" Jul. 1993.

TR 45.5 3GPP2 C.S0002-C Version 1.0; (May 28, 2002); Physical Layer Standard for cdma 2000; Spread Spectrum Systems (Release C).

Written Opinion—PCT/US2005/027640, International Search Authority, European Patent Office, Nov. 25, 2005.

Sinnaraja R., "1xBCMCS-BSPM Deployment Options", C23-BCMCAHG-20030915-003(QCOM-BSPM-deployment-options), 3GPP2, Sep. 16, 2003.

Sinnarajah, R., "1xBCMCS Overview of cdma2000 L2/L3 Design", C23-20030512-013 (1xBCMCS-L2-L3-Design), 3GPP2, May 12, 2003.

Sinnarajah, R., et al., "1x Broadcast Service Overview of cdma2000 L2/L3 Design", 023-20020708-010_Qualcomm_C23-20020610-002R1 (Broadcast-Service-cdma2000-L2-L3-Design)-2, 3GPP2, Jul. 16, 2002.

Sinnarajah, R., et al., "1x Broadcast Service Overview of cdma2000 L2/L3 Design", 023-20020708-010R1_Qualcomm_023-20020708-010-R1 (Broadcast-Service-cdma2000-L2-L3-Design), 3GPP2, Aug. 7, 2002.

Zou, X., et al., "Dedicated mode (on traffic channel) BCMCS", C23-20030818-020 (CCSA_BCMCS_on_traffic_channel)-2, 3GPP2, Aug. 21, 2003.

\* cited by examiner

US 8,644,862 B2

METHOD AND SYSTEM FOR SIGNALING IN BROADCAST COMMUNICATION SYSTEM

CLAIM OF PRIORITY UNDER 35 U.S.C. §119

The present application for Patent is a continuation and claims priority to U.S. application Ser. No. 10/938,712, filed Sep. 10, 2004, entitled "METHOD AND SYSTEM FOR SIGNALING IN BROADCAST COMMUNICATION SYSTEM", and Provisional Application No. 60/502,504 entitled "METHOD AND SYSTEM FOR SIGNALING IN BROADCAST COMMUNICATION SYSTEM" filed Sep. 11, 2003, and assigned to the assignee hereof and hereby expressly incorporated by reference herein.

BACKGROUND

1. Field

The present invention relates to broadcast communications, otherwise known as point-to-multipoint, in a wireline or a wireless communication system. More particularly, the present invention relates to a system and method for signaling in such a broadcast communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access wireless communication system, communications between users are conducted through one or more base stations. A first user on one wireless subscriber station communicates to a second user on a second wireless subscriber station by transmitting data on a reverse link to a base station. The base station receives the data and can route the data to another base station. The data is transmitted on a forward link of the same base station, or the other base station, to the second subscriber station. The forward link refers to transmission from a base station to a wireless subscriber station and the reverse link refers to transmission from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station. In many communication systems, e.g., IS-95, W-CDMA, IS-2000, the forward link and the reverse link are allocated separate frequencies.

The above described wireless communication service is an example of a point-to-point communication service. In contrast, broadcast services provide central station-to-multipoint communication service. The basic model of a broadcast system consists of a broadcast net of users served by one or more central stations, which transmit information with a certain contents, e.g., news, movies, sports events and the like to the users. Each broadcast net user's subscriber station monitors a common broadcast forward link signal. Because the central station fixedly determines the content, the users are generally not communicating back. Examples of common usage of broadcast services communication systems are TV broadcast, radio broadcast, and the like. Such communication systems are generally highly specialized purpose-build communication systems. With the recent, advancements in wireless cellular telephone systems there has been an interest of utilizing the existing infrastructure of the—mainly point-to-point cellular telephone systems for broadcast services. (As used herein, the term "cellular" systems encompasses communication systems utilizing both cellular and PCS frequencies.)

Introduction of a common broadcast forward link to a cellular telephone systems, requires integration of broadcast services with the services provided by the cellular telephone systems. The subscriber station needs to be able support functions allowing the subscriber station to function in both the broadcast mode and communication mode. There is, therefore, a need in the art for a method and a system for a signaling in cellular telephone system providing broadcast services allowing the subscriber station to consummate both services.

SUMMARY

Embodiments disclosed herein address the above stated needs by providing a method for a subscriber station registration in a broadcast communication system, comprising receiving a HSBS channel modulating a first frequency; monitoring a timer status for the HSBS channel; and if the timer status is expired then performing a broadcast service registration with a sector transmitting the HSBS channel, setting status of the timer for the HSBS channel to enabled; and start a timer for the HSBS channel. The base station receives the broadcast service registration from the subscriber station at a sector; adds a paging identifier to the subscribers' station paging set; and starting a timer for the paging identifier.

In accordance with another aspect, the base station sends a paging message to the subscriber station in accordance with a status of the paging set.

In accordance with another aspect, the above stated needs are addressed by providing methods for paging a subscriber station in a broadcast communication system, without the need for registration by the subscriber station.

DETAILED DESCRIPTION

Definitions

Figure 1:
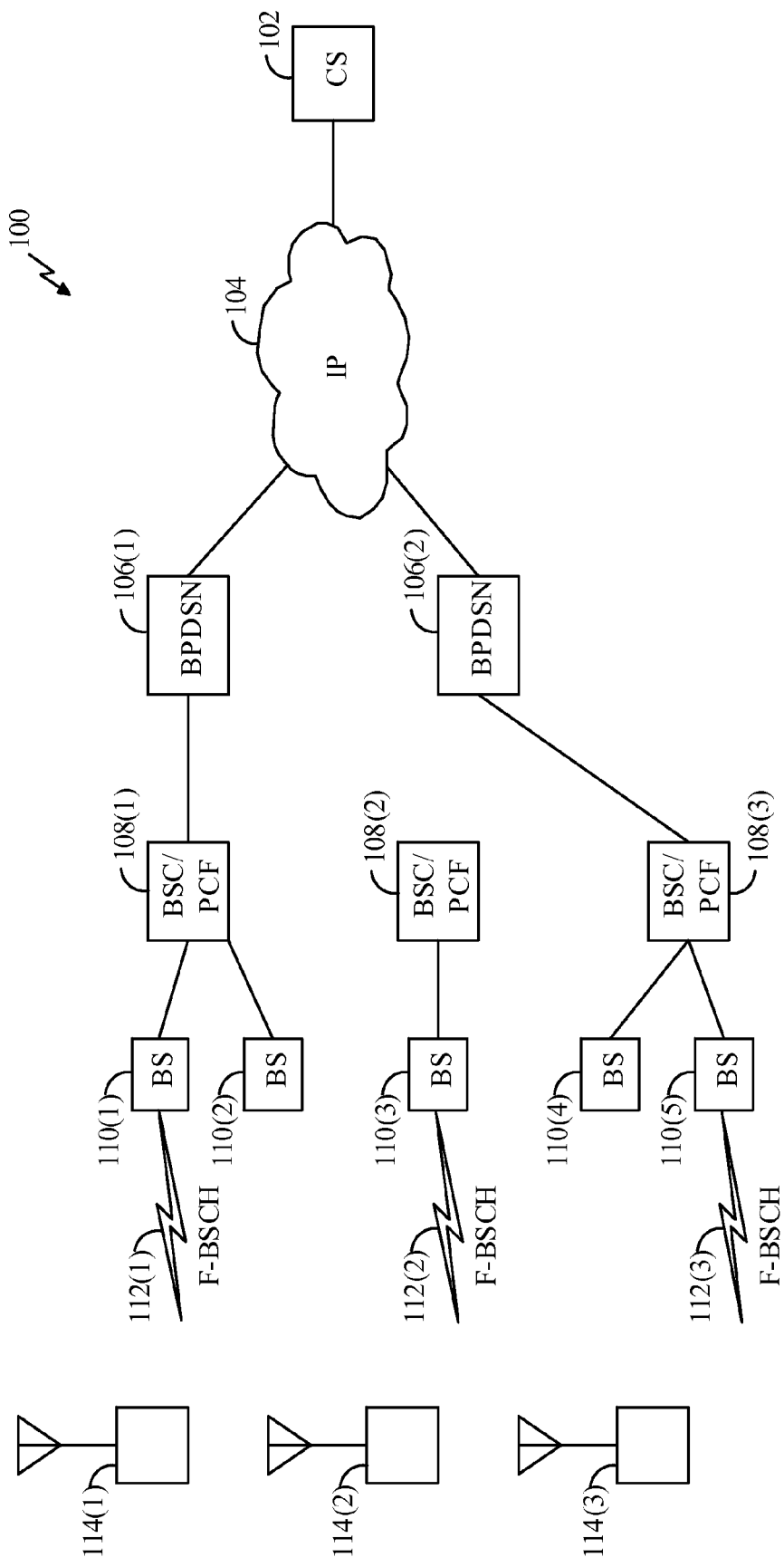
FIG. 1 illustrates conceptual block diagram of a High-Speed Broadcast Service communication system.

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated communication channel.

The terms group service, point-to-multipoint communication, push-to-talk, or dispatch service are used herein to mean a communication wherein a plurality of subscriber stations are receiving communication from—typically—one subscriber station.

The term packet is used herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to a subscriber station.

The term soft hand-off is used herein to mean a communication between a subscriber station and two or more sectors, wherein each sector belongs to a different cell. The reverse link communication is received by both sectors, and the forward link communication is simultaneously carried on the two or more sectors' forward links.

The term softer hand-off is used herein to mean a communication between a subscriber station and two or more sectors, wherein each sector belongs to the same cell. The reverse link communication is received by both sectors, and the forward link communication is simultaneously carried on one of the two or more sectors' forward links.

The term erasure is used herein to mean failure to recognize a message.

DETAILED DESCRIPTION

As discussed, a basic model of a broadcast system comprises a broadcast net of users, served by one or more central stations, which transmit information with a certain contents, e.g., news, movies, sports events and the like to the users. Each broadcast net user's subscriber station monitors a common broadcast forward link signal. FIG. 1 illustrates conceptual block diagram of a communication system 100, capable of performing High-Speed Broadcast Service (HSBS) in accordance with embodiments of the present invention.

The broadcast content originates at a content server (CS) 102. The content server may be located within the carrier network (not shown) or outside Internet (IP) 104. The content is delivered in a form of packets to a broadcast packet data-serving node (BPDSN) 106. The term BPSDN is used because although the BPDSN may be physically co-located or be identical to the regular PDSN (not shown), the BPSDN may be logically different from a regular PDSN. The BPDSN 106 delivers the packets according to the packet's destination to a packet control function (PCF) 108. The PCF is a control entity controlling function of base stations 110 for the HSBS as a base station controller is for regular voice and data services. To illustrate the connection of the high level concept of the HSBS with the physical access network, FIG. 1 shows that the PCF is physically co-located or even identical, but logically different from a base station controller (BSC). One of ordinary skills in the art understands that this is for a pedagogical purposes only. The BSC/PCF 108 provides the packets to base stations 110.

Figure 2:
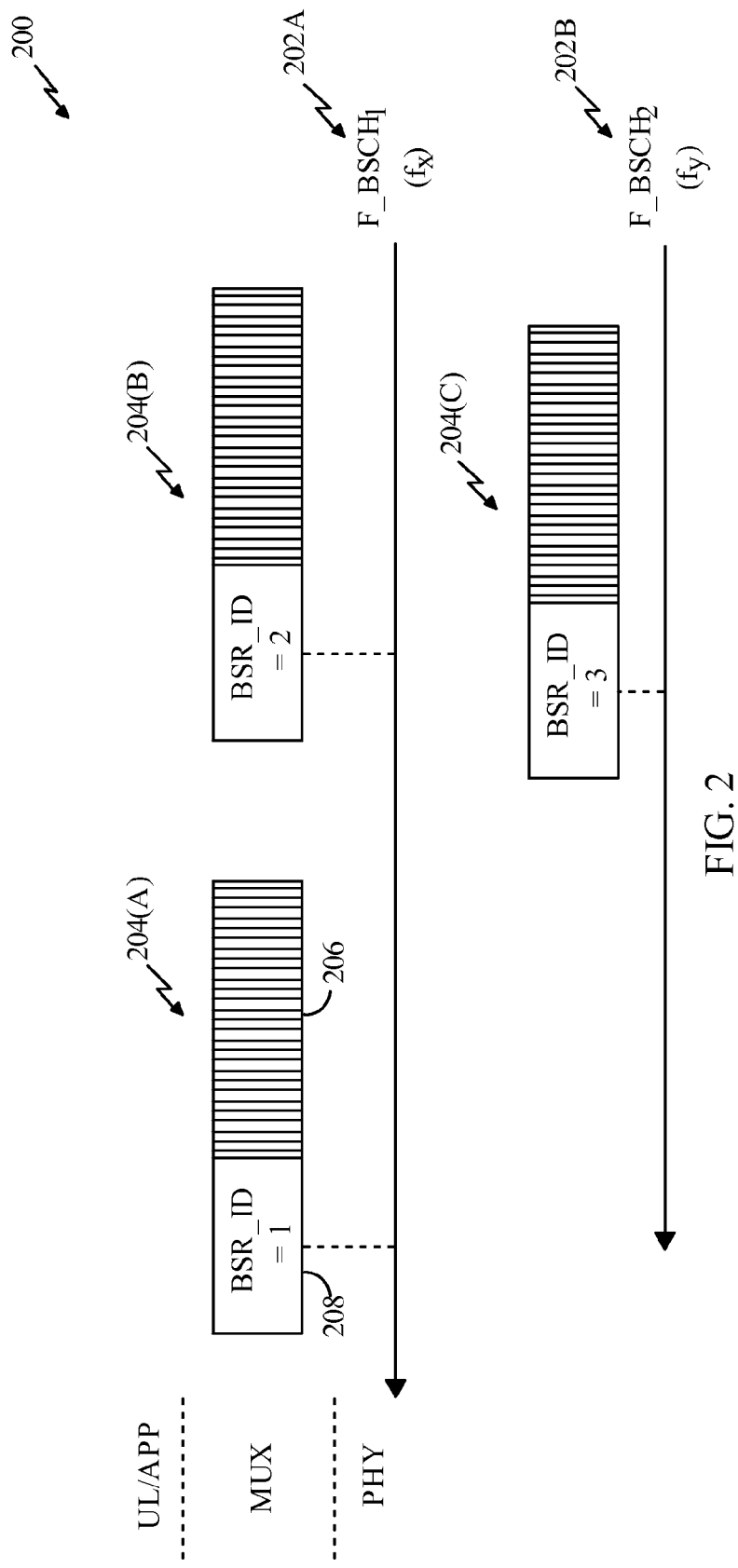
FIG. 2 illustrates a concept of physical and logical channels for the HSBS.

The communication system 100 enables High-Speed Broadcast Service (HSBS) by introducing a forward broadcast shared channel (F-BSCH) 112 capable of high data rates that can be received by a large number of subscriber stations 114. The term forward broadcast shared channel is used herein to mean a single forward link physical channel that carries broadcast traffic. A single F-BSCH can carry one or more HSBS channels multiplexed in a TDM fashion within the single F-BSCH. The term HSBS channel is used herein to mean a single logical HSBS broadcast session defined by the session's broadcast content. Each session is defined by a broadcast content that may change with time; for example, 7 am—News, 8 am—Weather, 9 am—Movies, etc. FIG. 2 illustrates the discussed concept of physical and logical channels for the HSBS.

As illustrated in FIG. 2, an HSBS is provided on two F-BSCHs 202, each of which is transmitted on a separate frequency fx, fy. Thus, for example, in the above-mentioned IS-2000 communication system such a physical channel can comprise e.g., a forward supplemental channel (F-SCH), forward broadcast control channel (F-BCCH), forward common control channel (F-CCCH), other common and dedicated channels and the channel's combination. The use of common and dedicated channels for information broadcast is disclosed in a provisional U.S. Patent Application Ser. No. 60/279,970, entitled "METHOD AND APPARATUS FOR GROUP CALLS USING DEDICATED AND COMMON CHANNELS IN WIRELESS NETWORKS", filed Mar. 28, 2001, and assigned to the assignee of the present invention. One of ordinary skills in the art understands that other communication systems utilize channels performing similar function, therefore, the teaching is applicable to other communication systems. The F-BSCHs 202 carry the broadcast traffic, which may comprise one or more broadcast sessions. The F-BSCHs 202b carries one HSBS channel 204c; two HSBS channels 204a, 204b are multiplexed onto the F-BCCH 202a. The content of an HSBS channel is formatted into packets comprising a payload 206 and a header 208.

One of ordinary skill in the art recognizes that the HSBS broadcast service deployment as illustrated in FIG. 2 is for pedagogical purposes only. Therefore, in a given sector, the HSBS broadcast service can be deployed in several manners in accordance with features supported by an implementation of a particular communication system. The implementation features include, e.g., the number of HSBS sessions supported, number of frequency assignments, number of broadcast physical channels supported, and other implementation features known to one skilled in the art. Thus, for example, more than two frequencies, and F-BSCHs may be deployed in a sector. Furthermore, more than two HSBS channels may be multiplexed onto one F-BSCH. Furthermore, a single HSBS channel can be multiplexed onto more than one broadcast channel within a sector, on different frequencies to serve the subscribers residing in those frequencies.

Because one or more different HSBS channels may be multiplexed onto the same F-BSCH physical channel, the different HSBS channels must be distinguished from one another. Consequently, the base station assigns each packet of a particular HSBS channel a broadcast service reference identifier (BSR_ID), which distinguishes one HSBS channels from another. Based on the value of the BSR_ID in the received packet, the demultiplexer at the subscriber station distinguishes, which packets are to be delivered to the decoder for the monitored HSBS channel. Consequently, the BSR_ID has over-the-air significance (that is, between subscriber station and BS).

As discussed, a HSBS channel means a single logical HSBS broadcast session defined by HSBS channel's broadcast content. Therefore, although the BSR_ID allows the subscriber station to separate physical broadcast transmissions of HSBS channels, an identifier for each logical HSBS channel is required so that the subscriber station can map a content of a HSBS channel to the physical broadcast transmissions of HSBS channel, i.e., the subscriber station must distinguish, e.g., a movie HSBS form a news HSBS. Therefore, each HSBS channel has a unique identifier (HSBS_ID), which links the HSBS Content/Service that the subscriber station has subscribed to and the corresponding physical broadcast transmissions. Consequently, the HSBS_ID has end-to-end significance (that is, between a subscriber station and a Content Server). The value of HSBS_ID is known through external means; that is, when subscriber station user subscribes to a broadcast content/service, the subscriber station user needs to obtain the HSBS_ID corresponding to that HSBS channel. For example, for special sporting events the entire schedule of the games is known beforehand and advertised, e.g., in mass media, the service provider campaign, and the like. Alternatively, news is broadcasted on a periodic schedule. Alternatively, the external means may comprise e.g., e-mail, short message system (SMS) broadcast, and other means known to one of ordinary skills in the art. In one embodiment, the schedule is provided within the HSBS broadcast sessions.

Finally, since the HSBS channels are multiplexed onto a F-BSCH physical channel, and there are various possibilities for how the HSBS channels could be carried in the F-BSCH channels, the subscriber station needs to know, which HSBS channel (HSBS_ID/BSR_ID) is carried on which F-BSCH (FBSCH_ID). Such information is specified by a logical-to-physical mapping. In the described embodiment, the logical-to-physical mapping is completely specified by the set {HSBS_ID, BSR_ID, FBSCH_ID}.

Broadcast Service Parameters Signaling

Because the base station carries out logical-to-physical mapping, this logical to physical mapping information needs to be signaled over the air to the subscriber stations so that a subscriber station desiring to monitor a given HSBS channel can determine which F-BSCH channel it should monitor. Therefore, a broadcast physical channel parameters, broadcast logical channel parameters, and logical-to-physical mapping need to be signaled to the subscriber station over the air interface.

In one embodiment, the broadcast service parameters are signaled in existing overhead messages on channel(s) provided by a communication system for overhead messages. However, because all subscriber stations must monitor the overhead messages, even the subscriber stations not subscribed to or not capable of an HSBS receive this message and need to decode at least a header of the message. In one embodiment, the header provides information, e.g., a sequence number that informs the subscriber station whether a contents of a message has changed. If only the content of the message pertaining to the overhead parameters has changed, all subscriber station must decode the remainder of the message.

Consequently, in another embodiment, the broadcast service parameters are signaled in an overhead message specific to broadcast service (BSPM). Only subscriber station subscribed/interested in the HSBS service need to monitor this message. Because a subscriber station may begin monitoring an HSBS channel at any time, the Broadcast Service Parameters Message needs to be continually transmitted by each sector that has configured one or more broadcast channels in any one of the sector's frequencies. In accordance with one embodiment, the Broadcast Service Parameters Message is sent on channel(s) provided by a communication system for overhead messages. In a communication system in accordance with the IS-2000 standard, such on channel(s) provided by a communication system for overhead messages can comprise, e.g., a forward paging channel (F-PCH), a forward broadcast control channel (F-BCCH), and other channel(s) provided by a communication system for overhead messages known to one of ordinary skills in the art. One of ordinary skills in the art understands that other communication systems utilize channels performing similar function; therefore, the teaching is applicable to other communication systems.

However, the subscriber station is able to monitor channel(s) provided by a communication system for overhead messages only when in an idle state. Consequently, when the subscriber station is monitoring the F-BSCH while engaged in another call, i.e., in a dedicated mode, the subscriber station does not have access to the Broadcast Service Parameters Message. Therefore, in one embodiment, the broadcast service parameters are signaled to a subscriber station in a dedicated mode via an existing message on one or more dedicated channels. However, because this embodiment requires use of a dedicated channel instead of sending the message once on channel(s) provided by a communication system for overhead messages, the message must be sent separately to each subscriber station. Consequently, in an alternative embodiment, the subscriber station continues to use the parameters received in the Broadcast Service Parameters Message, while acknowledging that these parameters may be out of date.

One of ordinary skills in the art recognizes that the Broadcast Service Parameters Message may be utilized for signaling additional broadcast related information. For example, the Broadcast Service Parameters Message also includes, for each physical channel a list of neighbors that are transmitting identical information such that a subscriber station can perform a handoff. The handoff method and system is described in detail in a co-pending U.S. patent application Ser. No. 09/933,607, entitled "METHOD AND SYSTEM FOR A HANDOFF IN A BROADCAST COMMUNICATION SYSTEM", filed Aug. 20, 2001. Additionally, the Broadcast Service Parameters Message may include information related to Broadcast Service Registration, described in detail below. Furthermore, the Broadcast Service Parameters Message may include HSBS Schedule Signaling, descried in detail below.

HSBS Schedule Signaling

The subscriber station users need to know the start time of HSBS sessions so that they can monitor an HSBS session. The users may also need to know the duration or end time of the HSBS session. In general, signaling of HSBS channel content schedule is beyond the scope of the air interface/communication system because, as discussed, the users subscribed to a HSBS service may know the schedule of the HSBS broadcast sessions. However, a user may require the convenience not to rely on an external means, and be able to retrieve an HSBS schedule using a subscriber station.

Consequently, in one embodiment, the base station informs the subscriber station of the start of a HSBS session by signaling message on a paging channel. This could be in the form of a broadcast paging message or broadcast short message system (SMS). This message indicates the start time of this HSBS session. All subscriber station monitoring the paging channel receive this message and only subscriber station configured to act to this message inform the subscriber station users. If the subscriber station user elects to monitor the HSBS session, the subscriber station tunes to the appropriate frequency to monitor the F-BSCH. However, the subscriber station may start monitoring the F-BSCH without prompting the user, if it has been so programmed.

Because the subscriber station user may decide to monitor the HSBS session at a time later than the start time of the session, it is not sufficient for the base station to send the message to the subscriber station only once before the start of the session since subscriber station that were not monitoring the paging channel at that time will not have received this message. The subscriber station could not monitor the paging channel for various reasons, e.g., being powered-off, in fade, in voice call, and other reasons known to one of ordinary skills in the art. Therefore, the message needs to be repeated throughout the duration of the HSBS session. The more frequent the message repetition is, the lower the average delay for a given subscriber station to join an on-going session.

In another embodiment, the base station informs the subscribers of the start of a HSBS session by signaling message, such as the Broadcast Service Parameter Message, on channel(s) provided by a communication system for overhead messages. The information conveyed is identical to the one sent on a paging channel, specifically start time and duration or end time. However, because the overhead messages are repeated, the information is sent continually. To prevent a subscriber from repeatedly reading the same message (with no change in content), a sequence number is added into the overhead message. The subscriber station ignores messages containing the same sequence number. Such use of sequence numbers is well known to one of ordinary skills in the art. In the embodiment, utilizing the Broadcast Service Parameters Message, the sequence number of the Broadcast Service Parameters Message is incremented only when any of its content changes such as when the session first starts and when it ends.

The end off the HSBS session to the subscribers currently monitoring the F-BSCH is indicated by a special end message send on the F-BSCH. This requires that multiplex sublayer knows which frames correspond to broadcast data and which ones correspond to signaling data (the end message). In one embodiment a value of BSR_ID, e.g., BSR_ID=000, indicates that the packet carries a signaling data. In another embodiment, the special message is unnecessary, the base station sends NULL frames on the F-BSCH. In yet another embodiment, the base station turns-off the F-BSCH. The subscriber station detects that no energy is being transmitted on F-BSCH and conclude that the HSBS session is over.

Alternatively, each of the above-discussed embodiments indicating the start of the session can be used for indicating the end of the session. In one embodiment, the content of the message indicating the start of the session includes information on the duration or end of the session. In another embodiment, an explicit message can be sent to indicate the end of the HSBS session.

Because a subscriber station engaged in another call may also desire to simultaneously monitor the F-BSCH, the start of a HSBS sessions must be signaled to the subscriber station in dedicated mode as well. The signaling methods according to discussed embodiments are equally applicable.

Call Model

A basic requirement for broadcast services is that a subscriber station in a common channel mode, i.e., not engaged in another call be able to monitor an HSBS service. Likewise, a subscriber station should be able to receive/make calls while receiving broadcast service. Therefore, while the subscriber station monitors a F-BSCH, the subscriber station is able to receive page notifications, send call originations, and perform registrations.

To enable the mode of operation, the subscriber station must be able to simultaneously monitor F-BSCH and channel(s) provided for overhead information. Such channels comprise, e.g., a forward common control channel (F-CCCH), and forward paging channel (F-PCH) in a communication system in accordance with the IS-2000. One of ordinary skills in the art understands that references to IS-2000 are for pedagogical purposes only, and other communication standards provide channels providing similar functionality. Furthermore, the subscriber must be able to simultaneously monitor F-BSCH and channel(s) provided for overhead information. Such channels comprise, e.g., a forward common control channel (F-CCCH), and forward paging channel (F-PCH), with or without a forward quick paging channel (F-QPCH) in a communication system in accordance with the IS-2000. Additionally, the subscriber station must be able to respond to pages, perform call originations, perform registrations, respond to MS directed messages, and perform other functions known to one skilled in the art, while monitoring F-BSCH. Therefore, a communication system in accordance with the IS-2000 may utilize, e.g., reverse access channel, (R-ACH), reverse enhanced access channel (R-EACH), and reverse common control channel (R-CCCH). The above mentioned channels must be available on the same frequency modulated by the F-BSCH.

A possible enhancement to the above introduced call model is the subscriber station ability to simultaneously listen to the HSBS channel and participate in another call (such as a voice call). Therefore, the F-BSCH and the dedicated traffic channels (allocated for voice call, etc.) must be in the same frequency since current models of subscriber station cannot monitor multiple frequencies simultaneously. The subscriber station can monitor the HSBS channel while in either common channel mode or dedicated channel mode. Additionally, the subscriber station must be able to simultaneously monitor F-BSCH and channels for traffic associated with other calls and/or signaling traffic. Such channels comprise, e.g., forward fundamental channel (F-FCH), forward dedicated control channel (F-DCCH) a communication system in accordance with the IS-2000. Finally, the subscriber station must be able to transmit on one or more channels for traffic associated with other calls and/or signaling traffic while monitoring F-BSCH. Such channels comprise, e.g., reverse fundamental channel (R-FCH), reverse dedicated control channel (R-DCCH) in a communication system in accordance with the IS-2000

When the subscriber station desires to originate another call while monitoring the HSBS channel, the subscriber station stop monitoring the HSBS channel, or if a simultaneous participation in HSBS and another call is supported proceeds with origination.

When the subscriber station receives a page while monitoring the HSBS channel, the subscriber station refuses to accept the incoming call and continues monitoring the HSBS channel. In accordance with one embodiment, the subscriber station sends a message to a paging base station indicating that the subscriber station is not interested in incoming calls, potentially indicating, which service options is the subscriber station not interested in. In accordance with another embodiment, the subscriber station sends a Page Response Message with a special service option to indicate that the subscriber station is not interested in this incoming call. Alternatively, the subscriber station transitions to the dedicated mode, receives the caller identification, and decides whether to accept the call or not, while continuing to monitor HSBS channel or while temporarily discontinuing the HSBS monitoring In accordance with another embodiment, when the subscriber station receives a page while monitoring the HSBS channel, the subscriber station channel accepts the incoming call and stop monitoring the HSBS channel. Alternatively, if simultaneous participation in HSBS and another call is supported, accepts the incoming call while continuing monitoring the HSBS channel.

In one embodiment, a subscriber station, not communicating on a traffic channel, monitors an HSBS channel in common channel mode, even if the subscriber station is capable of monitoring the an HSBS channel from the dedicated channel mode, since monitoring the HSBS channel from the dedicated channel mode requires more system resources. Consequently, when the subscriber station simultaneously monitors an HSBS channel, communicates on a traffic channel, and the communication ends, the subscriber station releases the dedicated channel and transitions to the common channel mode.

Frequency Hashing and Paging

When a base station receives request to communicate with a subscriber station, the base station generates a paging message for the subscriber station. The base station then determines which paging channel the subscriber station monitors, and transmits the paging message on the paging channel. Because base stations of communication systems may support multiple paging channels per frequency and/or multiple frequencies, a method of determining, both at the base station and the subscriber station, which frequency and a paging channel the subscriber station monitors have been developed. A method, based on IS-2000 standard is described. One of ordinary skills in the art understands that the choice of the IS-2000 standard is for pedagogical purposes, and any method that assures agreement between a base station and a subscriber station can be readily substituted.

Upon a power-up, a subscriber station enters a system determination substate, in which the system upon which to perform an acquisition attempt is selected. In one embodiment, after having selected a system for system determination, the subscriber station transitions into a pilot acquisition substate, in which the subscriber station attempts to demodulate a pilot signal based on the acquisition parameters retrieved in the system determination substate. The subscriber station attempts to acquire a CDMA pilot signal in accordance with the acquisition parameters. When the subscriber station detects a pilot signal with energy above a predetermined threshold value, the subscriber station transitions into a Sync channel acquisition substate and attempts acquisition of the Sync channel. Typically, the Sync channel as broadcasted by the base stations includes basic system information such as the system identification (SID) and the network identification (NID), but most importantly provides timing information to the subscriber station. The subscriber station adjusts the subscriber's station timing in accordance with the Sync channel information and then enters the subscriber station idle state. The subscriber station begins the idle state processing by receiving an overhead channel identified in the Sync channel message, and if a base station, which the subscriber station acquired supports multiple frequencies, both the subscriber station and the base station use a hash function to determine, which frequency to use for communication. The subscriber station and base station then use the hash function to determine a paging channel, which the subscriber station monitors. In one embodiment, the hashing function accepts number of entities to hash, e.g., frequencies, paging channels, and the like and an international subscriber station identifier (IMSI) and outputs one entity.

Figure 3:
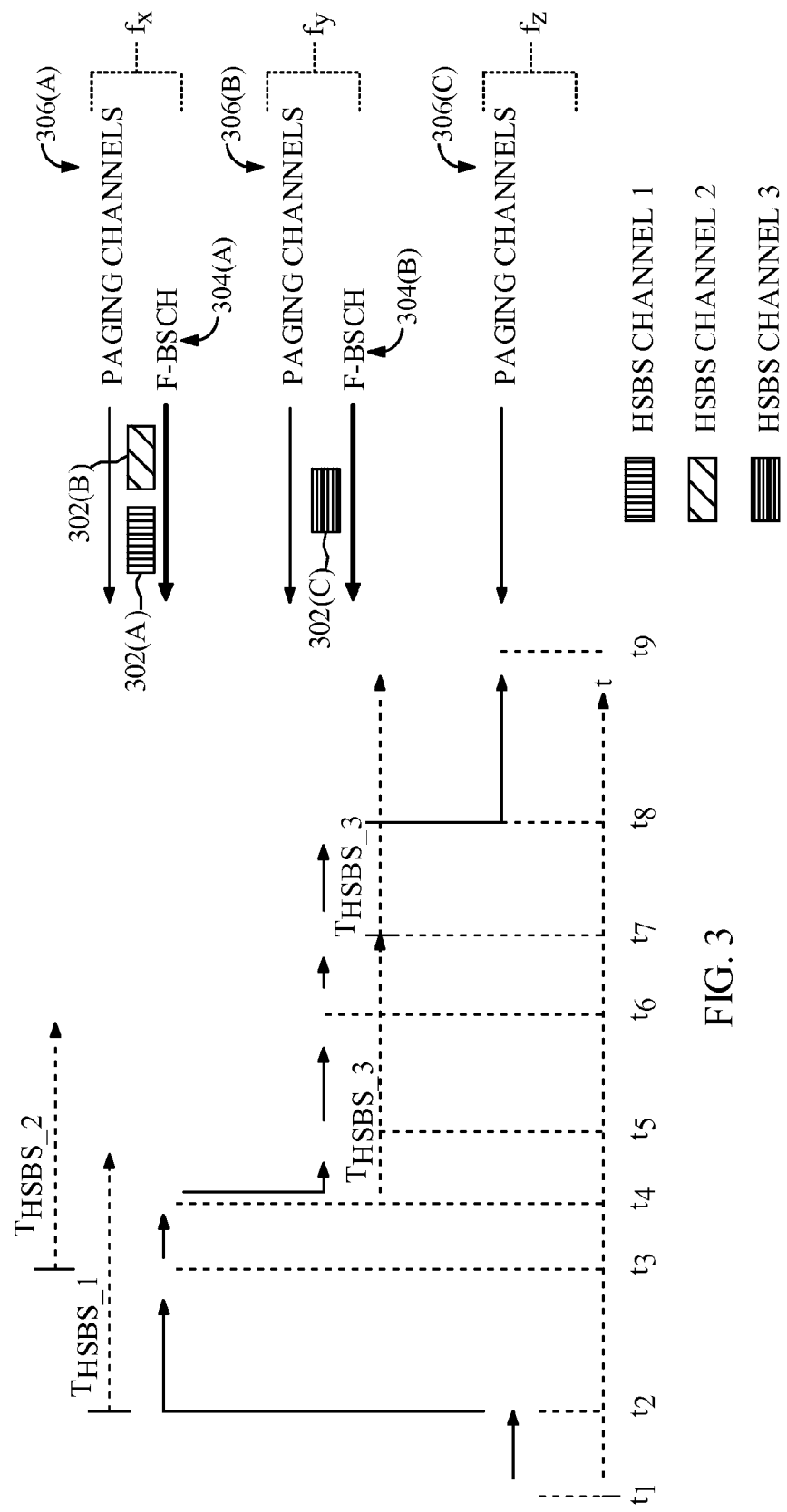
FIG. 3 illustrates paging set maintenance in accordance with one embodiment.

The above-described method (hereinafter referred to as current hashing method) works well in point-to-point communication systems. However, the current hashing method cannot be directly applied to broadcast services, as explained in reference to FIG. 3. FIG. 3 illustrates two HSBS channels 302a, 302b multiplexed on a F-BSCH channel 304a that is transmitted on a frequency $f_x$ and one HSBS channel 302c multiplexed on a F-BSCH channel 304b that is transmitted on a frequency $f_y$. There are no HSBS channels on frequency $f_z$. Paging channels 306a, 306b, and 306c are transmitted on the respective frequencies $f_x$, $f_y$, and $f_z$. Although only one paging channel per frequency is shown in FIG. 3, one of ordinary skills in the art recognizes that this is for pedagogical purposes only, because mapping of a subscriber station on a particular paging channel is determined by the hashing function. If a subscriber station is subscribed to all three HSBS channels 302, it can freely change reception from one HSBS channel 302 to another HSBS channel 302. The term subscribe is used herein to mean that the subscriber station is allowed to receive a particular HSBS channel.

Let us assume, without loss of generality, that at time $t_1$, a subscriber station is powered up. Using, e.g., the above-described hashing method, the subscriber station tunes to frequency $f_z$, registers with the base station, and starts monitoring paging channel 306c. The base station performs identical hashing method, to determine that the subscriber station is monitoring, paging channel 306c at frequency $f_z$. At time $t_2$, the subscriber station decides to monitor a HSBS channel 302a. As explained above, a subscriber station desiring to receive a HSBS channel must monitor the frequency containing the F-BSCH channel, modulated by the HSBS channel. Consequently, the subscriber station tunes to frequency $f_x$ and starts receiving the HSBS channel 302a. Because of limitation at the subscriber station, which allows the subscriber station to be tuned only to one frequency, the subscriber station monitors the paging channel 306a on frequency $f_x$. Because the subscriber station is required to be able to receive paging messages while receiving a HSBS channel, the paging messages to the subscriber station must be sent on a paging channel on frequency $f_x$. However, the current hashing method does not account for a scenario, in which the subscriber station may change frequencies. Therefore, the base station, which hashed the subscriber station on paging channel 306c at frequency $f_z$, is not aware of the subscriber station re-tuning Consequently, a page message sent by the base station on paging channel 306c at frequency $f_z$ would fail. Therefore, a method and system is needed to appraise a base station at which frequency to page a subscriber station. One of ordinary skills in the art recognizes that once the frequency is determined, current paging channel determination methods can be utilized.

Therefore, in accordance with one embodiment of the present invention, a subscriber station registers with a base station the identity of each HSBS channel the subscriber station has subscribed to and is interested in monitoring. Since each HSBS channel modulates a corresponding F-BSCH on a specific frequency, the base station knows which set of frequencies the subscriber station can be found on, and hence can page the subscriber station successfully. The registration of an HSBS channel is utilized during handoff. The objective of the handoff is to transfer a subscriber station from the HSBS channel transmitted by a first base station to the HSBS channel transmitted by a second base station. However, the HSBS channel may be modulating different frequencies at the first and second base station, however the HSBS has the same unique identifier HSBS_ID; since each base station knows the frequency on which a given HSBS_ID is transmitted (via the logical-to-physical mapping) the base station can successfully page the subscriber. Thus, registration of the identity of each HSBS channel aids the handoff. In accordance with another embodiment, the subscriber station registers with the base station the frequency modulated by the HSBS channel the subscriber station has subscribed to and is interested in monitoring. The registration is performed periodically in accordance with a status of a timer for a particular HSBS channel.

To allow for such a registration, the subscriber station maintains a status of a timer for each HSBS channel (HSBS_TIMER_STATUSs) to which the subscriber station has subscribed to and is interested in monitoring. The HSBS channel is identified by a unique identifier (HSBS_ID). Each timer's HSBS_TIMER_STATUSs is either "Enabled" (i.e. the timer running) or "Expired" (i.e., the timer is not running) The subscriber station further maintains a counter, Broadcast Service Registration Timer, for each HSBS channel (THSBS) that the subscriber station is interested in monitoring. The counter is incremented at a pre-determined time intervals. When the counter reaches a pre-determined value (HSBS_REG_TIMER), the subscriber station indicates timer expiration and set HSBS_TIMER_STATUSs to "Expired".

Upon power-up, a subscriber station initializes the HSBS_TIMER_STATUS, to "Expired" for all channels. The subscriber station then tunes to a frequency in accordance with current hashing method and registers with a base station transmitting the frequency. When the subscriber station tunes to a frequency modulated by an HSBS channel identified by HSBS_ID=i, if HSBS_TIMER_STATUS$_s$[i] is set to "Expired", the subscriber station performs a broadcast service registration with the base station for the HSBS channel, sets HSBS_TIMER_STATUSs[i] to "Enabled," and starts a counter $T_{HSBS[I]}$. When the counter $T_{HSBS[I]}$ expires while the subscriber station is still monitoring the HSBS channel i, the subscriber station again performs the broadcast service registration with the base station for the HSBS channel i, set HSBS_TIMER_STATUSs[i] to "Enabled," and starts the counter $T_{HSBS[I]}$. When the subscriber station is tuned to a particular frequency (either as a result of initial power-up registration procedure or as a result of monitoring a HSBS channel i) and desires to monitor HSBS channel j on the same frequency, then if HSBS_TIMER_STATUSs[j] is set to "Expired," the subscriber station performs a broadcast service registration with the base station for the HSBS channel j, set HSBS_TIMER_STATUSs[j] to "Enabled," and starts the counter $T_{HSBS[j]}$.

Each base station maintains for each subscriber station a paging set (PAGE_SET). Upon receiving a power-up registration from an i-th subscriber station, the PAGE_SET$_j$ for the subscriber station is initialized to contain the frequency to which the subscriber station tuned to in accordance with current hashing method, i.e., PAGE_SET$_j$={$f_{power-up}$}. When the base station receives a broadcast service registration from the subscriber station for a HSBS channel identified by HSBS_ID=i, base station adds the HSBS channel identifier (HSBS_ID) to the paging set PAGE_SET$_j$={$f_{power-up}$, i}, and starts a counter $T_{HSBS[I]}$. If the counter $T_{HSBS[I]}$ corresponding to a HSBS channel i for the subscriber station expires, the base station removes the HSBS_ID=i from the paging set. When there is an incoming call for the subscriber station, the base station uses the logical-to-physical mapping to determine the frequency or frequencies corresponding to all HSBS channels having identifiers in the paging set. The base station then sends a paging message to the subscriber station on all these frequencies. Consequently, the timer at the subscriber station and the timer at the base station must be synchronized or the timer at the base station must not expire before the timer at the subscriber station expires. If the timer at the base station expired before the timer at the subscriber station expired, the base station would remove the HSBS_ID=i from the paging set, while the subscriber station could still be at the HSBS channel.

As discussed, the registration is performed periodically when the counter $T_{HSBS[i]}$ reaches a value determined by a value HSBS_REG_TIMER, which is a configurable parameter transmitted to the subscriber station by the base station. The value HSBS_REG_TIMER is determined as an optimum between the signaling load ensuing from subscriber station broadcast service registration and signaling load ensuing from uncertainty as to at what frequencies the subscriber station needs to be paged. To decrease signaling load, the broadcast service registration may be combined with another type of registration, e.g., a time-based registration, distance-based registration, zone-based registration, and other types of registration as known to one of ordinary skills in the art. For example, in the time-based registration the base station configures a subscriber station to register in a pre-determined time intervals. If a subscriber station performs a broadcast service registration, the subscriber station does not need to perform a time-based registration for that period because the base station determines the whereabouts of the subscriber station from the broadcast service registration.

Referring back to FIG. 3, the method performed by a subscriber station and a base station in accordance with the above-described embodiment of the present invention is illustrated. At time $t_1$, the subscriber station powers up, tunes to frequency $f_z$ using a current procedure, sets HSBS_TIMER_STATUS$_s$ to "Expired" for all HSBS channels, and registers. The base station initializes the subscriber station's page set to frequency $f_z$. (PAGE_SET$_i$={fz}). (The subscript i identifies the subscriber station)

At time $t_2$, the subscriber station desires to monitor an HSBS channel 302a. (HSBS_ID=1). The subscriber station tunes to frequency $f_x$, sends a broadcast service registration for HSBS channel 302a, sets HSBS_TIMER_STATUSs[1] to "Enabled," and starts a counter $T_{HSBS[1]}$. The base station sets the PAGE_SET$_i$={1, fz,}

At time $t_3$, the subscriber station is no more interested in monitoring the HSBS channel 302a, but desires to monitor an HSBS channel 302b. The subscriber station sends a broadcast service registration for HSBS channel 302b, sets HSBS_TIMER_STATUSs[2] to "Enabled," and starts a counter $T_{HSBS[2]}$. The base station sets the PAGE_SET$_i$={2, 1, fz}.

At time $t_4$, the subscriber station is no more interested in monitoring the HSBS channel 302b, but desires to monitor an HSBS channel 302c. The subscriber station tunes to frequency fy, sends a broadcast service registration for HSBS channel 302c, sets HSBS_TIMER_STATUSs[3] to "Enabled," and sets a counter $T_{HSBS[3]}$. The base station sets the PAGE_SET$_i$={3, 2, 1, fz}.

At time $t_5$, the counter $T_{HSBS[1]}$, expires, consequently, the subscriber station sets HSBS_TIMER_STATUSs[1] to "Expired." Because the subscriber station is no more monitoring the HSBS channel 302a, therefore, the subscriber station need not send a broadcast service registration for HSBS channel 302a, consequently, the base station removes the HSBS ID=1 from the paging set. Therefore, the PAGE_SET$_i$={3, 2, fz}.

At time $t_6$, the counter $T_{HSBS[2]}$ expires, consequently, the subscriber station sets HSBS_TIMER_STATUSs[2] to "Expired." Because the subscriber station is no more monitoring the HSBS channel 302b, therefore, the subscriber station need not send a broadcast service registration for HSBS channel 302b, consequently, the base station removes the HSBS_ID=2 from the paging set. Therefore, the PAGE_SET$_i$={3, fz}.

At time $t_7$, the counter $T_{HSBS[3]}$ expires, consequently, the subscriber station sets HSBS_TIMER_STATUSs[3] to "Expired." Because the subscriber station monitors the HSBS channel 302c, the subscriber station sends a broadcast service registration for HSBS channel 302c, sets HSBS_TIMER_STATUSs[3] to "Enabled," and restarts the counter $T_{HSBS[3]}$. The base station keeps the PAGE_SET$_i$={3, fz}

At time $t_8$, the subscriber station is no more interested in any HSBS channels. In one embodiment, the subscriber station tunes to fz and enters an idle state. There is no change in the PAGE_SET={3, fz}. In another embodiment, the subscriber station remains on a frequency $f_y$.

At time $t_9$, the counter $T_{HSBS[3]}$ expires. In accordance with the embodiment, in which the subscriber station tunes to fz and enters an idle state, the subscriber station sets HSBS_TIMER_STATUSs[3] to "Expired." Because the subscriber station is no more monitoring the HSBS channel 302c, the subscriber station need not send a broadcast service registration for HSBS channel 302c, consequently, the base station removes the HSBS_ID=3 from the paging set. Therefore, PAGE_SET$_i$={fz}. In accordance with the embodiment, in which the subscriber station stays at $f_y$ and enters an idle state, the subscriber station sends a broadcast service registration for HSBS channel 302c, sets HSBS_TIMER_STATUSs[3] to "Enabled," and restarts the counter $T_{HSBS[3]}$. The base station keeps the PAGE_SET$_i$={3, fz}.

In alternative embodiments, there is no need for a registration. In one embodiment, HSBS channels are transmitted on all frequencies of a sector. Consequently, the current hashing method can be utilized. Under certain circumstances, the embodiment may be impractical because the resource allocation to deploy the F-BSCH on all frequencies may become too burdensome. Furthermore, the F-BSCH, modulated by the HSBS channels, is high power channel; therefore, it acts as an interferer.

Therefore, in another embodiment, the base station sends a paging message on paging channel of the frequency, to which a subscriber station initially tuned in accordance with current hashing method, and on paging channel of all the frequencies modulated by HSBS channels. The embodiment trades an easy paging decision utilizing current hashing method, and no need to know subscriber station HSBS subscription details against an increased paging load at multiple frequencies and multiple paging channels.

To decrease the paging load, in accordance to another embodiment, the subscriber stations are divided into two classes. First class comprises the subscriber stations that are not subscribed to or not capable of an HSBS service, second class comprises subscriber stations subscribed to an HSBS service. The base station is provided with subscription information of the subscriber station to be paged. The subscription information is provided, e.g., from a home location register (HLR), an HSBS content server or similar entity in the communication system. If no HSBS session is in progress, all the subscriber stations tune to frequencies in accordance with current hashing method. The base station thus pages a subscriber station at the appropriate frequency and a paging channel. When an HSBS service begins, the subscriber stations belonging into the second class that are interested in an HSBS session tune to an appropriate HSBS channel. The base station pages the subscriber stations belonging to the first class according to current paging methods. The base station knows whether an HSBS session is on or of, and knows the subscriber profile of each subscriber station belonging to the second class. Therefore, the base station sends a paging message to a subscriber station belonging into the second class on the paging channel on the frequencies to which the subscriber stations initially tuned and on the paging channels on the frequencies modulated by the HSBS channels to which the subscriber station is subscribed to. The embodiment trades low paging load, no need to modify current hashing method against the need to know subscriber stations subscription information.

To prevent uneven subscriber station distribution among frequencies due to subscriber stations' tuning to a different frequency modulated by a HSBS channel, the above-described embodiment may be modified by entering only frequencies not modulated by an HSBS to a hash function for the subscriber stations belonging to the first class. Furthermore, if an HSBS session is in progress, only frequencies modulated by an HSBS may be entered to a hash function for the subscriber stations belonging to the second class. One of ordinary skills in the art recognizes that other combinations of frequencies can be used in accordance with usage pattern of the access network.

Consequently, in another embodiment, a subscriber station notifies a base station upon beginning or ending monitoring of a HSBS channel. Thus, a subscriber station initially tunes to a frequency in accordance with current hashing method. When the subscriber station desires to monitor a HSBS channel, the subscriber station sends a Notification Message to the base station indicating the desire to monitor the HSBS channel, and tunes to the frequency, which the HSBS channel modulates. When the subscriber station is no more interested in the HSBS channel reception, the subscriber station sends a Notification Message indicating the desire to cease monitoring the HSBS channel, and tunes back to the original frequency. This embodiment assumes a trust relationship between a subscriber station and an access network. If such relationship has not been established, upon receiving the Notification Message the base station ascertains that the subscriber station is subscribed to the requested HSBS channel, and either grants or denies the request. Only upon receiving the access grant does the subscriber station tunes to the frequency, which the HSBS channel modulates. Because the base station is explicitly notified about the current frequency, which the subscriber station is tuned to it can successfully page the subscriber station. The embodiment trades an easy paging decision, no need to modify the current hashing method, no need to know a subscriber station's subscription against a large reverse link signaling load, which is potentially bursty, e.g., upon beginning and ending of popular programs.

To decrease the reverse link signaling load, in another embodiment, a subscriber station notifies a base station only if the subscriber station changes frequency. Thus, a subscriber station initially tunes to a frequency in accordance with current hashing method. When the subscriber station desires to monitor a HSBS channel, which modulates a different frequency than the subscriber station monitors, the subscriber station sends a Notification Message to the base station indicating the desire to monitor the HSBS channel, and tunes to the frequency, which the HSBS channel modulates. When the subscriber station is no more interested in the HSBS channel reception, the subscriber station discontinues HSBS monitoring. No action on the part of the subscriber station is necessary because the subscriber station does not change frequency. Because the base station is explicitly notified about the current frequency, which the subscriber station is tuned to it can successfully page the subscriber station. As in the above-described embodiment, a request-response may be required if no trust relationship has been established between a subscriber station and an access network. The embodiment trades an easy paging decision, no need to modify the current hashing method, no need to know a subscriber station's subscription against a large reverse link signaling load, which is potentially bursty, e.g., upon beginning and ending of popular programs.

One skilled in the art will appreciate that although the flowchart diagrams are drawn in sequential order for comprehension, certain steps can be carried out in parallel in an actual implementation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A flexible method to deploy Broadcast Service Parameters Message in a sector may also be needed.

In the idle state BCMCS design, the mobile station may enter its hash-to frequency in the idle state as specified in the current cdma2000 standard. Similarly, while in the hash-to frequency, the mobile station monitors the hash-to paging channel. This ensures that all mobile stations (regardless of whether they support BCMCS or not) will follow same procedures for system determination, idle state frequency selection, and idle state paging channel selection. Once the mobile station enters the hash-to frequency on the idle state, if the user requests BCMCS_FLOW_IDx, then the mobile station will read the BSPM (Broadcast Service Parameters Message) on that frequency (i.e. mobile station's hash-to frequency and hash-to paging channel) to determine whether BCMCS_FLOW_IDx is available in that sector. If BCMCS_FLOW_IDx is available in that sector, mobile station determines from the BSPM all the necessary information to monitor this service (such as the frequency where it is being transmitted, configuration parameters of the F-BSCH, etc.). The mobile station then tunes to the appropriate frequency (if different from the hash-to frequency) and monitors F-BSCH.

The above design implies that the BSPM must be signaled in each paging channel on each frequency of the sector since mobiles interested in BCMCS could be on any one of the frequency and on any one of the paging channel. For the same reasons, each of these BSPM must carry information about BCMCS_FLOW_IDs available on all frequencies on that sector. This is desirable from the mobile station point of view since it minimizes the delay for the mobile station to start monitoring the desired BCMCS content. But if the number of BCMCS_FLOW_IDs transmitted in a sector is very large, this scheme may be considered inefficient from network point view due to the large amount of overhead (i.e. BSPMs) needed to provide BCMCS service. This is illustrated in following & Table 1.

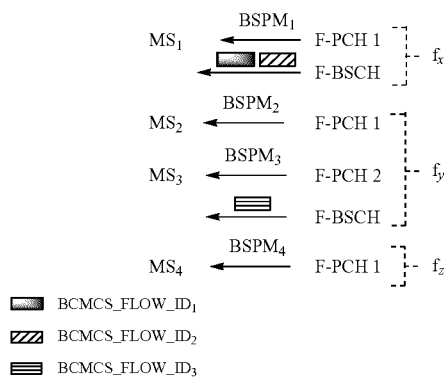

TABLE 1

| BSPM1 | ALL INFO for BCMCS_FLOW_ID1 |
| --- | --- |
|  | ALL INFO for BCMCS_FLOW_ID2 |
|  | ALL INFO for BCMCS_FLOW_ID3 |
| BSPM2 | ALL INFO for BCMCS_FLOW_ID1 |
|  | ALL INFO for BCMCS_FLOW_ID2 |
|  | ALL INFO for BCMCS_FLOW_ID3 |
| BSPM3 | ALL INFO for BCMCS_FLOW_ID1 |
|  | ALL INFO for BCMCS_FLOW_ID2 |
|  | ALL INFO for BCMCS_FLOW_ID3 |
| BSPM4 | ALL INFO for BCMCS_FLOW_ID1 |
|  | ALL INFO for BCMCS_FLOW_ID2 |
|  | ALL INFO for BCMCS_FLOW_ID3 |

In order to provide the operator the flexibility to trade-off between amount of BSPM overhead and delay to start monitoring BCMCS in their BCMCS deployment, we propose a flexible mechanism for BSPM deployment as described below.

On each paging channel on each frequency, information about BCMCS availability in that sector is provided via one of four possible methods:

1. Indicate BCMCS is not available in that sector
2. Indicate BCMCS is available in that sector and point to the frequency & paging channel where the MS can determine information about BCMCS_FLOW_IDs available in that sector
3. Provide a list of BCMCS_FLOW_IDs available in that sector and point to the frequency & paging channel where information about that specific BCMCS_FLOW_ID can be obtained
4. Provide a list of BCMCS_FLOW_IDs available in that sector and provide all necessary information the mobile station needs to monitor that specific BCMCS_FLOW_ID The above four methods signaling BCMCS information is implemented via the following combination of the System Parameters Message/MC-RR Parameters Message & the BSPM as follows:

In System Parameters Message/MC-RR Parameters Message, a 2-bit flag (BCMCS_IND) is added which is set as follows:

BCMCS_IND=00→BCMCS service not available in this sector

As long as MS resides in this sector, user will not be able to receive any BCMCS service, and BSPM is not transmitted in this sector BCMCS_IND=01→BCMCS service available in this sector but go to BCMCS_FREQ/BCMCS_PAGECH to collect all the necessary information BSPM is not transmitted on this paging channel on this frequency, and note that BCMCS_FREQ could be this frequency and only the paging channel is different. This allows BS to send BSPM in only in frequencies where F-BSCH is deployed and hence reduce BSPM overhead. Mobiles interested in BCMCS knowing where to get the information when needed.

BCMCS_IND=10→BCMCS service available in this sector and read the BSPM on this frequency and on this paging channel to collect all the necessary information. This BSPM provides additional flexibility.

When BCMCS_IND=00 or 01, a BSPM is not transmitted in the current frequency on the current paging channel. When BCMCS_IND=10, a BSPM is transmitted on the current frequency on the current paging channel and it provides the following flexibilities via the BSPM_BCMCS_IND flag:

BSPM_BCMCS_IND=1→All BCMCS_FLOW_IDs available in this sector are listed in this BSPM.

BSPM_BCMCS_IND=0→Not all BCMCS_FLOW_IDs available in this sector are listed in this BSPM. For BCMCS_FLOW_IDs not listed in this BSPM, information on frequency and paging channel is provided where the mobile station can get information.

For either case of BSPM_BCMCS_IND, for each BCMCS_FLOW_IDs listed in the BSPM there are two methods for providing information:

Only point to the frequency and paging channel where MS can collect all the necessary information about this BCMCS_FLOW_ID; no additional information given, and Include all the necessary information (Ex. F-BSCH Walsh Code, BSR_ID, etc) to allow MS to monitor the given BCMCS_FLOW_ID From a mobile station's point of view, for a given BCMCS_FLOW_IDx in a given sector, the above design results in one of 6 following outcomes at the mobile station's hash-to frequency and hash-to paging channel:

1. System Parameters Message/MC-RR Parameters Message signal BCMCS_IND=00→BCMCS_FLOW_IDx cannot be monitored in this sector
2. System Parameters Message/MC-RR Parameters Message contains BCMCS_IND=01→MS needs to tune to BCMCS_FREQ/BCMCS_PAGECH to determine whether or not BCMCS_FLOW_IDx is available in this sector
3. System Parameters Message/MC-RR Parameters Message contains BCMCS_IND=10; MS reads the BSPM on this frequency; BSPM signals BSPM_BCMCS_IND=0; BSPM does not list BCMCS_FLOW_IDx→MS needs to tune to BCMCS_FREQ/BCMCS_PAGECH to determine whether or not BCMCS_FLOW_IDx is available in this sector
4. System Parameters Message/MC-RR Parameters Message contains BCMCS_IND=10; MS reads the BSPM on this frequency; BSPM signals BSPM_BCMCS_IND=1; BSPM does not list BCMCS_FLOW_IDx→BCMCS_FLOW_IDx cannot be monitored in this sector
5. System Parameters Message/MC-RR Parameters Message contains BCMCS_IND=10; MS reads the BSPM on this frequency; BSPM lists BCMCS_FLOW_IDx but only points to the BCMCS_FREQ where information about BCMCS_FLOW_IDx can be collected→BCMCS_FLOW_IDx can be monitored in this sector but MS must tune to BCMCS_FREQ to determine where/how to monitor BCMCS_FLOW_IDx
6. System Parameters Message/MC-RR Parameters Message contains BCMCS_IND=10; MS reads the BSPM on this frequency; BSPM lists BCMCS_FLOW_IDx and provides all the information→BCMCS_FLOW_IDx can be monitored in this sector and MS has all the information to determine where/how to monitor BCMCS_FLOW_IDx From network's point of view, the following flexible options are available:

1. BSPM transmitted on each paging channel on each frequency contains information about BCMCS_FLOW_IDs available on all frequencies of this sector
2. BSPM transmitted on each frequency contains list of BCMCS_FLOW_IDs available on all frequencies of this sector and points to the frequency where the necessary information to monitor that BCMCS_FLOW_ID can be collected
3. Only one frequency transmits a BSPM containing all the necessary information about BCMCS_FLOW_IDs available in other frequencies (see NOTE 1); other frequencies simply point the mobile stations to this frequency to collect the necessary information
4. Various combinations of the above 3 options based on deployment needs and types of BCMCS services.

Some example use of these options for the scenario described and shown above and below,

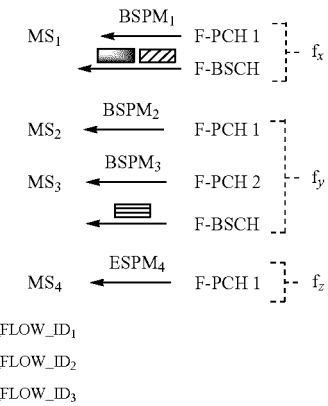

TABLE 2

| ESPM1<br>BCMCS_IND = 10 | BSPM1 | BSPM_BCMCS_IND = 1<br>ALL INFO for BCMCS_FLOW_ID1<br>ALL INFO for BCMCS_FLOW_ID2<br>BCMCS_FLOW_ID3 = fy |
|---|---|---|
| ESPM2<br>BCMCS_IND = 10 | BSPM2 | BSPM_BCMCS_IND = 1<br>ALL INFO for BCMCS_FLOW_ID3<br>BCMCS_FLOW_ID1 = fx<br>BCMCS_FLOW_ID2 = fx |
| ESPM3<br>BCMCS_IND = 10 | BSPM3 | BSPM_BCMCS_IND = 1<br>ALL INFO for BCMCS_FLOW_ID3<br>BCMCS_FLOW_ID1 = fx<br>BCMCS_FLOW_ID2 = fx |
| ESPM4<br>BCMCS_IND = 01& fx | — | BSPM not transmitted |

TABLE 3

| ESPM1<br>BCMCS_IND = 10 | BSPM1 | BSPM_BCMCS_IND = 1<br>ALL INFO for BCMCS_FLOW_ID1<br>ALL INFO for BCMCS_FLOW_ID2<br>BCMCS_FLOW_ID3 = fy |
|---|---|---|
| ESPM2<br>BCMCS_IND = 10 | BSPM2 | BSPM_BCMCS_IND = 0<br>ALL INFO for BCMCS_FLOW_ID3<br>Additional BCMCS = fx |
| ESPM3<br>BCMCS_IND = 10 | BSPM3 | BSPM_BCMCS_IND = 0<br>ALL INFO for BCMCS_FLOW_ID3<br>Additional BCMCS = fx |
| ESPM4<br>BCMCS_IND = 01& fx | — | BSPM not transmitted |

NOTE 1:
When a BCMCS_FLOW_IDx is transmitted in frequency x, then the BSPM in that frequency must list all the information about this BCMCS_FLOW_IDx. This is required to avoid interruption in MS BCMCS reception if MS has to keep tuning to another frequency to get BSPM updates (worst yet, MS has no idea when BSPM on another frequency is transmitted).

NOTE 2:
None of the above restrictions apply to the case where Autonomous BCMCS request is allowed (i.e. MS is allowed to ask for BCMCS_FLOW_IDs that are not listed in the overhead). In BSPM we already have a flag for this; we need to add similar flag (actually use one value of BCMCS_IND) to say the same in System Parameters Message/MC-RR Parameters Message.

What is claimed is:

1. An apparatus operable in a wireless communication system, the apparatus comprising:
a transmitter configured to transmit, on each of at least one channel provided for overhead information on each of at least one frequency, first information indicating broadcast/multicast service in a sector; and
a processor communicatively coupled to the transmitter and configured to generate the first information and a broadcast service parameters message;
wherein the first information is not included in the broadcast service parameters message; and
wherein the broadcast service parameters message comprises a list of available identifiers of broadcast/multicast flows in the sector and points to respective frequencies and overhead channels where information about the available identified broadcast/multicast flows in the sector can be obtained.

2. The apparatus of claim 1, wherein the first information indicates at least one of:
broadcast/multicast service is not available in the sector;
broadcast/multicast service is available in the sector and a mobile station is to go to a broadcast/multicast frequency in a broadcast/multicast channel provided for overhead information for information about available identifiers of broadcast/multicast flows in the sector; or
broadcast/multicast service is available in the sector and a broadcast service parameters message is being transmitted on the respective channel provided for overhead information of the respective frequency.

3. The apparatus of claim 2, wherein the broadcast service parameters message comprises a list of available identifiers of broadcast/multicast flows in the sector and information that enables the mobile station to monitor a specific identifier of a broadcast/multicast flow.

4. The apparatus of claim 2, wherein the broadcast service parameters message comprises second information for indicating whether the broadcast service parameters message lists all identifiers of broadcast/multicast flows available in the sector.

5. The apparatus of claim 4, wherein the second information comprises a one-bit indicator.

6. The apparatus of claim 4, wherein the second information comprises a BSPM_BCMCS_IND.

7. The apparatus of claim 1, wherein the first information comprises a two-bit indicator.

8. The apparatus of claim 1, wherein the first information comprises a BCMCS_IND.

9. An apparatus for signaling in a broadcast communication system, the apparatus comprising:
processor means for generating a first indicator for indicating availability of broadcast/multicast service in a sector and a broadcast service parameters message; and
communication means, communicatively coupled to the processor means, for transmitting the first indicator on each of at least one channel provided for overhead information on each of at least one frequency;
wherein the first indicator is not included in the broadcast service parameters message; and
wherein the broadcast service parameters message comprises a list of available identifiers of broadcast/multicast flows in the sector and points to respective frequencies and overhead channels where information about the available identified broadcast/multicast flows in the sector can be obtained.

10. The apparatus of claim 9, wherein the first indicator indicates at least one of:
broadcast/multicast service is not available in the sector;
broadcast/multicast service is available in the sector and a mobile station is to go to a broadcast/multicast frequency in a broadcast/multicast channel provided for overhead information for information about available identifiers of broadcast/multicast flows in the sector; or
broadcast/multicast service is available in the sector and a broadcast service parameters message is being transmitted on the respective channel provided for overhead information of the respective frequency.

11. The apparatus of claim 10, wherein the broadcast service parameters message comprises a list of available identifiers of broadcast/multicast flows in the sector and information that enables the mobile station to monitor a specific identifier of a broadcast/multicast flow.

12. The apparatus of claim 10, wherein the broadcast service parameters message comprises a second indicator for indicating whether the broadcast service parameters message lists all identifiers of broadcast/multicast flows available in the sector.

13. The apparatus of claim 12, wherein the second indicator comprises one bit.

14. The apparatus of claim 12, wherein the second indicator is a BSPM_BCMCS_IND.

15. The apparatus of claim 9, wherein the first indicator comprises two bits.

16. The apparatus of claim 9, wherein the first indicator is a BCMCS_IND.

17. A computer program product residing on a non-transitory processor-readable medium and comprising processor-readable instructions configured to cause a processor to:
generate a first indicator for indicating availability of broadcast/multicast service in a sector;
generate a broadcast service parameters message; and
transmit the first indicator on each of at least one channel provided for overhead information on each of at least one frequency;
wherein the first indicator is not included in the broadcast service parameters message; and
wherein the broadcast service parameters message comprises a list of available identifiers of broadcast/multicast flows in the sector and points to respective frequencies and overhead channels where information about the available identified broadcast/multicast flows in the sector can be obtained.

18. The computer program product of claim 17, wherein the first indicator indicates at least one of:
broadcast/multicast service is not available in the sector;
broadcast/multicast service is available in the sector and a mobile station is to go to a broadcast/multicast frequency in a broadcast/multicast channel provided for overhead information for information about available identifiers of broadcast/multicast flows in the sector; or
broadcast/multicast service is available in the sector and a broadcast service parameters message is being transmitted on the respective channel provided for overhead information of the respective frequency.

19. The computer program product of claim 18, wherein the broadcast service parameters message comprises a list of available identifiers of broadcast/multicast flows in the sector and information that enables the mobile station to monitor a specific identifier of a broadcast/multicast flow.

20. The computer program product of claim 18, wherein the broadcast service parameters message comprises a second indicator for indicating whether the broadcast service parameters message lists all identifiers of broadcast/multicast flows available in the sector.

21. The computer program product of claim 20, wherein the second indicator is a one-bit indicator.

22. The computer program product of claim 20, wherein the second indicator is a BSPM_BCMCS_IND.

23. The computer program product of claim 17, wherein the first indicator is a two-bit indicator.

24. The computer program product of claim 17, wherein the first indicator is a BCMCS_IND.

25. An apparatus operable in a wireless communication system, the apparatus comprising:
    processor means for generating first information relating to broadcast/multicast service availability in a sector, the first information including one or more of at least:
        an available identifier of a broadcast/multicast flow in the sector and pointing to a respective frequency and a respective channel provided for overhead information where second information about the identified broadcast/multicast flow is obtained; or
        the available identifier of a broadcast/multicast flow in the sector and providing the second information that enables a mobile station to monitor the identified broadcast/multicast flow; and
    communication means, communicatively coupled to the processor means, for transmitting the first information on each of at least one channel provided for overhead information on each of at least one frequency.

26. The apparatus of claim 25, wherein the first information about broadcast/multicast service availability in a sector comprises an indicator for indicating whether the broadcast/multicast service is available in the communication system, and wherein the indicator is not included in a broadcast service parameters message.

27. The apparatus of claim 26, wherein the indicator comprises two bits.

28. The apparatus of claim 26, wherein the indicator is a BCMCS_IND.

29. The apparatus of claim 25, wherein the list of available identifiers of broadcast/multicast flows is included in a broadcast service parameter message.

30. The apparatus of claim 29, wherein the broadcast service parameters message comprises an indicator for indicating whether the broadcast service parameter message lists all the identifiers of broadcast/multicast flows available in the sector.

31. The apparatus of claim 30, wherein the indicator comprises one bit.

32. The apparatus of claim 30, wherein the indicator is a BSPM_BCMCS_IND.

33. The apparatus of claim 25, wherein the first information further comprises:
    an indication that broadcast/multicast service is available in the sector and pointing to a frequency and channel provided for overhead information where a mobile station determines the second information about available identifiers of broadcast/multicast flows in the sector.

34. The apparatus of claim 25, wherein the first information further comprises:
    an indication that broadcast/multicast service is not available in the sector.

35. The apparatus of claim 25, wherein the identifier of a broadcast/multicast flow is a BCMCS_FLOW_ID.

36. A method comprising:
    transmitting, on each of at least one channel provided for overhead information on each of at least one frequency, first information indicating broadcast/multicast service in a sector; and
    generating the first information and a broadcast service parameters message;
    wherein the first information is not included in the broadcast service parameters message; and
    wherein the broadcast service parameters message comprises a list of available identifiers of broadcast/multicast flows in the sector and points to respective frequencies and overhead channels where information about the available identified broadcast/multicast flows in the sector can be obtained.

37. The method of claim 36, wherein the first information indicates at least one of:
    broadcast/multicast service is not available in the sector;
    broadcast/multicast service is available in the sector and a mobile station is to go to a broadcast/multicast frequency in a broadcast/multicast channel provided for overhead information for information about available identifiers of broadcast/multicast flows in the sector; or
    broadcast/multicast service is available in the sector and a broadcast service parameters message is being transmitted on the respective channel provided for overhead information of the respective frequency.

38. The method of claim 37, wherein the broadcast service parameters message comprises a list of available identifiers of broadcast/multicast flows in the sector and information that enables the mobile station to monitor a specific identifier of a broadcast/multicast flow.

39. The method of claim 37, wherein the broadcast service parameters message comprises second information for indicating whether the broadcast service parameters message lists all identifiers of broadcast/multicast flows available in the sector.

40. The method of claim 39, wherein the second information comprises a one-bit indicator.

41. The method of claim 39, wherein the second information comprises a BSPM_BCMCS_IND.

42. The method of claim 36, wherein the first information comprises a two-bit indicator.

43. The method of claim 36, wherein the first information comprises a BCMCS_IND.

44. The method of claim 36, wherein the at least one channel provided for overhead information comprises one or more of: a control channel, or a paging channel.

45. The apparatus of claim 1, wherein the at least one channel provided for overhead information comprises one or more of: a control channel, or a paging channel.

46. The apparatus of claim 9, wherein the at least one channel provided for overhead information comprises one or more of: a control channel, or a paging channel.

47. The computer program product of claim 17, wherein the at least one channel provided for overhead information comprises one or more of: a control channel, or a paging channel.

48. The apparatus of claim 25, wherein the at least one channel provided for overhead information comprises one or more of: a control channel, or a paging channel.

* * * * *